United States Patent [19]

Gehring et al.

[11] Patent Number: 4,795,199
[45] Date of Patent: Jan. 3, 1989

[54] CLAMPING SLEEVE FOR PIPES

[75] Inventors: Manfred Gehring, Freudenstadt, Fed. Rep. of Germany; Heinz Plüss, Courtaman, Switzerland

[73] Assignee: NAGE AG, Switzerland

[21] Appl. No.: 784,166

[22] Filed: Oct. 4, 1985

[30] Foreign Application Priority Data

Dec. 15, 1984 [DE] Fed. Rep. of Germany ....... 3445807
Jul. 3, 1985 [EP] European Pat. Off. ........... 85108204

[51] Int. Cl.$^4$ ............................................. F16L 21/06
[52] U.S. Cl. .................... 285/236; 285/253; 285/367
[58] Field of Search ............... 285/236, 373, 367, 253, 285/410, 411; 24/279, 20 EE, 20 TT

[56] References Cited

U.S. PATENT DOCUMENTS

| 2,417,741 | 3/1947 | Dillion | 24/279 |
| 2,998,269 | 8/1961 | Houghton | 285/236 |
| 3,104,898 | 9/1963 | MacDonald | 285/236 |
| 3,142,881 | 8/1964 | Johnston | 285/253 X |
| 3,419,291 | 12/1968 | Tomb et al. | 285/236 |
| 3,572,773 | 3/1971 | Read | 285/236 |
| 3,834,744 | 9/1974 | Masatchi | 24/279 |
| 4,492,393 | 1/1985 | Schaub | 285/236 |
| 4,521,940 | 6/1985 | Oetiker | 24/279 X |

FOREIGN PATENT DOCUMENTS

| 706777 | 3/1965 | Canada | 285/236 |
| 57373 | 8/1982 | European Pat. Off. | 285/236 |
| 79457 | 5/1983 | European Pat. Off. | 285/373 |
| 8102137 | 8/1982 | Fed. Rep. of Germany . | |
| 703105 | 10/1930 | France . | |
| 1011740 | 3/1949 | France . | |
| 2149037 | 6/1985 | United Kingdom | 285/253 |

Primary Examiner—Randolph A. Reese
Assistant Examiner—Anthony Knight
Attorney, Agent, or Firm—McCormick, Paulding and Huber

[57] ABSTRACT

In a clamping sleeve for pipes, which consists of a rubber-elastic sealing ring and a clamping ring (2) encircling the sealing ring, on the ends of which clamping ring (2) are attached parts (4, 5) having clamping plates directed outward and located opposite one another, the gap between the clamping plates is bridged by a sheet-metal part which sits against the outer side of the clamping ring and, like the clamping ring (2) itself also has edges which are bent radially inward and, at the overlapping point with the end of the clamping ring (2), fit between the bent edges of the clamping ring. The sheet-metal part (15) is formed by an end section of the clamping ring (2) which has a longitudinal slot (18) which extends up to its end and, in turn opens at its inner end into a transverse slot (19).

11 Claims, 2 Drawing Sheets

CLAMPING SLEEVE FOR PIPES

The invention relates to a clamping sleeve for pipes, comprising a rubber-elastic sealing ring and a clamping ring which encircles the sealing ring and is in the form of a sheet-metal strip bent in a circular shape, which sheet-metal strip has edges bent radially inward which grip over the end faces of the sealing ring, on the ends of which are attached clamping plates which are directed outward, are located opposite one another and are penetrated by at least one clamping screw, and in which the gap between the clamping plates is bridged by a sheet-metal part sitting against the outside of the sealing ring.

Such a clamping sleeve is known from German Utility Model No. 8,102,137. In this known clamping sleeve, a special sheet-metal part is welded on to one end of the sheet-metal strip forming the clamping ring, which sheet-metal part extends beneath the other end of the sheet-metal strip. This sheet-metal part is narrower than the sealing ring and does not have any edges bent radially inward.

A clamping sleeve for pipes is known from the French Patent Specification No. 703,105, in which the clamping plates are arranged at a certain distance from the ends of the clamping ring, so that the end sections of the clamping ring can directly overlap. However, in this known clamping sleeve, the clamping ring does not have any edges bent radially inward.

A clamping sleeve is also known from the French Patent Specification No. 1,011,740, in which the clamping members are formed by end sections of the clamping band which are laid around outward and rearward and form a type of lug which encircles a rod extending transversely to the clamping band and is penetrated transversely by the clamping screws. The edges of the sheet-metal strip which are bent inward extend only up to the proximity of the lugs. The gap between the ends of the sheet-metal strip is bridged by a loosely inserted, additional sheet-metal part.

Clamping sleeves of the above described type are used to a considerable extent for connecting drainage pipes made of asbestos cement and cast iron. Because of the tolerances on the diameter of such pipes, it may be found that the clamping sleeves have to be clamped to a considerable extent during assembly to compensate the different diameters of adjacent pipes having the same nominal diameter. Consequently, deformation of the sealing ring can occur which can result in a lateral yielding of the sealing ring and consequently lead to leakage. Although the clamping ring edge bent radially inward limits the break-away movement of the sealing ring, this does not avoid leakage completely. In the clamp sleeve according to the French Patent Specification No. 1,011,740, the additional sheet-metal strip provided with an edge can be easily displaced before or during assembly or can even be lost and therefore also does not provide for required security.

Accordingly, the object of the invention is to develop further a clamping sleeve for pipes of the type mentioned at the beginning in such a way that the tightness of the clamping sleeve is improved and in particular a seal is ensured even under increased pressures without the construction and/or the handling of the clamping sleeve consequently becoming complicated.

This object is achieved according to the invention in that the sheet metal part bridging the gap between the clamping plates and forming a clamping ring end section projecting beyond one of the clamp plates also has edges which are bent radially inward and which, at least at the overlapping point with the end of the sheet-metal strip, fit between the bent edges of the sheet-metal strip.

Close examinations of the clamping sleeves have shown that leakage principally occurs in the area of the bridge at which the sealing ring is not held by its edges gripping over its end faces. This especially applies when, in known manner, the sealing rings have bulges projecting radially inward at their ends, in other words have a sealing action precisely at their ends. When an excess pressure exists inside the pipes, the bulges arranged at the edge of the sealing rings can yield in the area between the clamping plates of the clamping ring, where they are not laterally supported, and consequently lead to leakage. By means of the invention, it is ensured that the sealing rings are supported on their entire periphery at their end faces, so that the risk of leakage described above is avoided. Therefore the invention leads to an esential improvement in the sealing properties of the clamping sleeve and in particular its compressive strength. Since the sheet-metal part is formed by an end section of the sheet metal strip itself, which end section grips over one of the clamping plates, the clamping ring, because of its one-piece construction, is particularly simple in design and at the same time particularly stable. Finally, no mistakes which result in leakage can be made in using it.

However, special measures are required in the manufacture of such a clamping ring to reduce the width of the sheet-metal strip at one end, so that there is no possibility of manufacturing the sheet-metal strip with the bent edges as an endless band from which the sections necessary for manufacturing the clamping rings are then separated. Therefore a particularly preferred embodiment of the invention provides that the projecting end section of the sheet-metal strip has at least one longitudinal slot extending up to its end. Such a longitudinal slot enables the sections of the sheet-metal strip separated by said slots to approach each other and thus enables the width of the sheet-metal strip to be reduced to the extent that this end section, with its edges which are bent radially inward, can be guided between the bent edges of the opposite end section of the clamping ring. A particular advantage of this measure is that, by bending the sections separated by the longitudinal slot, a certain canting of the coupled end sections of the clamping ring toward one another is also possible, as can easily occur if the pipes to be joined to one another have different diameters.

In the clamping sleeve according to the invention, if a longitudinal slot is arranged in the centre of the sheet-metal strip, bending of the sheet-metal strip sections separated by the longitudinal slot is facilitated and becomes possible in particular without the risk of deformation of the sheet-metal strip if the longitudinal slot opens at its inner end into a transverse slot, at the ends of which remain only narrow material strips which do not offer any great resistance to bending of the sections. Therefore it is expedient if the transverse slot arranged advantageously in the area of the clamping plate extends up to the proximity of the outer edges of the sheet-metal strip. Optimum conditions result if the length of the transverse slot is about 75% of the width of the sheet-metal strip. Moreover, it can be expedient if the longitudinal slot widens or diverges outward.

In an alternative embodiment of the invention, two longitudinal slots are each arranged near to an edge of the clamping ring. The relatively narrow edge strips thus formed can in turn be easily bent inward to a sufficient extent in order to fit between the edges at the other end of the sheet-metal strip. At the same time, they themselves have a very high rigidity because of their angle profile. The clamping ring section remaining between the longitudinal slots is normally exposed on a short stretch near to its root, so that it is easily able to withstand even relatively high radial forces. Nevertheless, it can be expedient to reinforce the clamping ring section lying between the longitudinal slots by at least one bead extending in the peripheral direction of the clamping ring. In this way, this section receives a high inherent stability which is especially of importance when the clamping sleeve is still not assembled on the pipes to be connected but is exposed with the clamping ring still not closed and is then easily subject to the risk of bending.

Two beads parallel to the slots are advantageously arranged. Furthermore, it is expedient if the beads are made so as to run out in a flat manner toward the end of the section, so that, when the clamping band is tightened, they do not impede sliding off over the clamped sealing ring in the peripheral direction.

The invention is described and explained in greater detail below with reference to the illustrative embodiment shown in the drawing. In other embodiments of the invention, the features to be taken from the description and the drawing can be used individually by themselves or severally in any combination. In the drawing.

Figure 1:
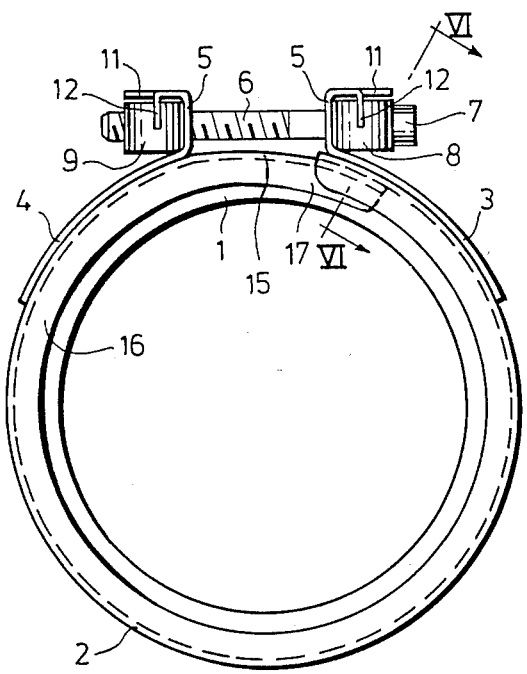
FIG. 1 shows the side view of a clamping sleeve according to the invention.
Figure 3:
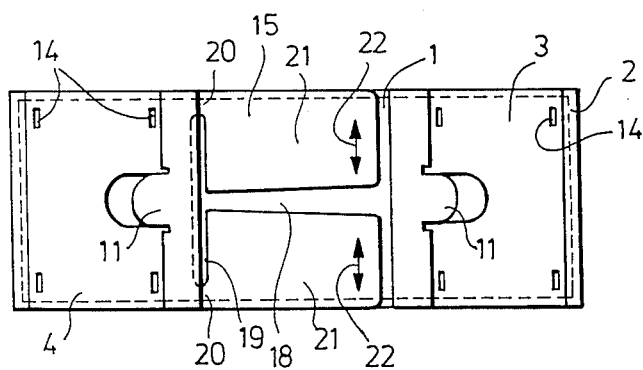
Figure 6:
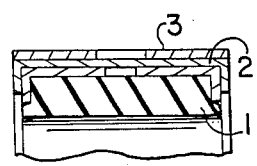
Figure 4:
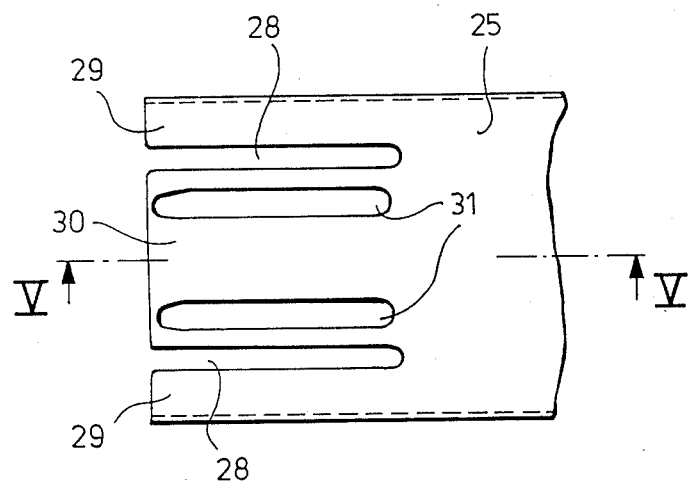
Figure 5:
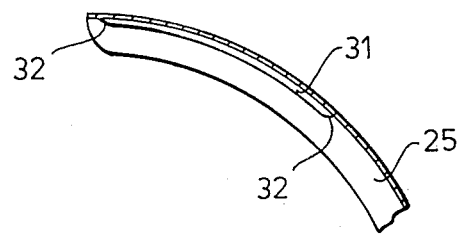

FIG. 3 shows a plan view of the clamping ring of the clamping sleeve according to FIG. 1 without a clamping screw and bent out to the extent that its ends no longer overlap, FIG. 4 shows a plan view of the end of the clamping ring of a further embodiment of the invention, FIG. 5 shows a section along the line V—V through the clamping ring end according to FIG. 4, and FIG. 6 is a fragmentary sectional view taken along the line VI—VI, of FIG. 1.

Figure 2:
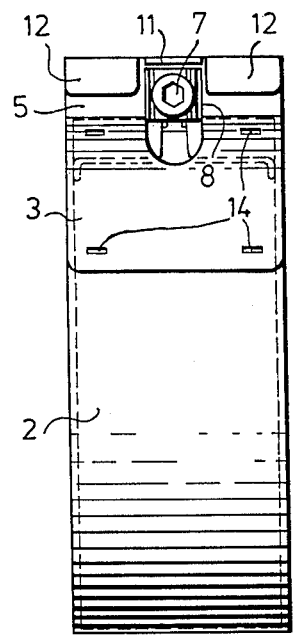
FIG. 2 shows the front view of the clamping sleeve according to FIG. 1.

The clamping sleeve shown in FIGS. 1 and 2 consists of a rubber-elastic sealing ring 1 and a clamping ring 2 which encircles the sealing ring and is in the form of a sheet-metal strip bent in a circular shape, on the outer side of which are fixed two sheet-metal parts 3 and 4, the ends facing toward one another of which are bent and firm clamping plates 5 which are located parallel to one another and at a distance opposite one another. These clamping plates are penetrated by a central clamping screw 6 which is supported at its head 7 on the respective outer side of the clamping plate 5 by an intermediate piece 8 and at its other end by an intermediate piece 9 designed as a nut. The ends of the rigid sheet-metal parts 3 and 4 attached onto the clamping ring are again bent following the sections forming the clamping plates 5 and in fact once in the centre area and then twice following the centre area, so that tongues 11 project from the clamping plates 5 in the centre area, which tongues 11 grip over the ends of the intermediate pieces 8 and 9 and in this way form stops for the intermediate pieces. The sections placed next to the tongues 11 are bent in a U shape in such a way that the legs 12 of these sections are arranged laterally next to the intermediate pieces 8 and 9 and form lateral stops for these intermediate pieces. In the illustrative embodiment shown, so-called compression-joint connections 14 are used for connecting the sheet-metal parts 3 and 4 to the clamping ring 2.

Of the two sheet-metal parts 3 and 4, one sheet-metal part 3 is directly attached to the end of the clamping ring 2, whereas an end section 15 of the clamping ring projects beyond the other sheet-metal part 4, which end section 15 extends beneath the other end of the clamping ring 2 and thus forms a bridge which closes the clamping ring into a complete circle. The edges 16 of the clamping ring 2 are bent inward on its entire length, therefore also in the area of the end section 15. At the same time, the width of the end section 15 is reduced to such an extent at its free end that the end section matches the bent edges 17 between the bent edges 16 at the other end of the clamping ring 2. For this purpose, the end section 15 has a longitudinal slot 18 which widens toward its open end and extends from the free end of the end section to a transverse slot 19 which extends at the point where the clamping plate 5 of the adjacent sheet-metal part 4 is located up to the proximity of the outer edges of the clamping band 2, so that only narrow connecting points 20 remain at the ends of the transverse slot 19, which connecting points 20 enable the sections 21 of the clamping ring 2 which are separated by the longitudinal slot 18 to be bent in the tangential plane defined by these sections, that is, in the direction of the arrows 22 in FIG. 3. By this means, it is not only possible to insert the end section 15, with its bent edges 17, between the edges 16 at the other end of the clamping band; a rigid parallel guidance of the two ends on the clamping band relative to one another is also avoided, so that the clamping ring can easily sustain certain deformations as always occurs when the pipes to be connected to one another by means of such a clamping sleeve have different diameters from one another. These deformations are necessary to ensure a sound joint and seal of the pipes by means of the clamping sleeve despite such differences in diameter.

The weakening of the end section 15 of the clamping ring 2 by the slots 18 and 19 is completely harmless, because the sections 21 of the clamping ring which are defined by these slots nevertheless have a high bending rigidity and are perfectly held and guided. The bending rigidity results from the bent edges 17, whereas the positional fixing is ensured on the one hand by the connection with the main part of the clamping ring 2 at the ends of the transverse slot 19 and on the other hand by the seating on both the inner side of the clamping ring 2 and on its bent edges 16. At the same time, it must be taken into account that the sections 21 do not need to transmit any clamping forces whatsoever acting in the peripheral direction of the clamping sleeve, but are only to prevent a radial and axial yielding of the sealing ring 1 in the area between the two clamping plate 5. This task is perfectly fulfilled by the sections 21, so that the sealing ring 1 is now pressed accurately against the pipes on its entire periphery and also clamped in the axial direction, and a sound seal of the pipes to be connected to one another by means of such a clamping sleeve is ensured by powerful internal pressure.

In the embodiment according to FIGS. 4 and 5, the end section 25 of the clamping ring, instead of a central slot, has two longitudinal slots 28 arranged near to the lateral edges, by means of which longitudinal slots 28 the end section 25 is subdivided into two edge sections 29 and a centre section 30.

The edge sections 29 can be bent inward far enough in order to fit between the bent edges at the other end of the clamping band. At the same time, these sections 29 have high inherent rigidity because of their angle profile.

The centre section 30 is reinforced by two beads 31 which are arranged closely next to and parallel to the longitudinal slots 28. These beads 31 run out in a flat manner at their ends and thus merge gently into the surface of the clamping band. Sharp edges are consequently avoided which could prevent relative movement of the clamping band relative to the sealing ring it is pressed against, especially when the clamping band is being tightened. It can be seen that a structure is also created here in which, although it enables the end section 25 of the clamping band to be inserted between the bent edges at the other end without additional design measures having to be taken to reduce the width of this end section 25, the sections separated by the slots have a very high rigidity, so that they are not subject to any inadmissible deformation.

It goes without saying that the invention is not limited to the illustrative embodiments shown. Thus the possibility could exist of leaving the end section 15 of the clamping ring without a slot and giving it a reduced width in another manner, so that it fits between the bent edges 16 at the other end of the clamping ring. The invention also does not depend on the number of clamping screws acting on the clamping plates. It can be used in particular in such clamping sleeves in which two of such clamping screws are arranged parallel to one another and the clamping plates are divided in the area between the clamping screws, so that the clamping sleeve can adapt better to pipes of different diameters. In such clamping sleeves especially, considerable deformation of the clamping ring can occur which as a result of the invention does not have a disadvantageous effect with respect to the sealing ring being pressed soundly against the pipe. However, the embodiments shown are presently regarded as an optimum realisation of the inventive idea with regard to both their ease of manufacture and their function.

We claim:

1. A clamping sleeve for pipes comprising an elastomeric sealing ring having radially disposed end faces, an elongated sheet-metal strip having a substantially uniform width and a generally circular shape, said strip defining a clamping ring for encircling said sealing ring and including radially inwardly directed outer edges extending along the entire length of said strip for engaging and gripping said end faces when said strip is disposed in encircling relation to said sealing ring, said strip having one end portion terminating at one end of said strip and an opposite end portion terminating at the opposite end of said strip, means for allowing reduction in the width of said one end portion to permit said one end portion to be received within said other end portion between the radially inwardly directed outer edges of said other end portion when said strip is in encircling relation to said sealing ring and including at least one slot through said one end portion extending longitudinally of said strip and opening outwardly through said one end of said strip, said opposite end portion overlapping said one end portion when said strip is disposed in encircling relation to said sealing ring, opposing clamping plates attached to said clamping ring, one of said clamping plates being attached to said clamping ring near said opposite end, the other of said clamping plates being attached to said clamping ring in spaced relation to said one end, said one end portion projecting beyond said other clamping plate, and means for drawing said clamping plates toward each other including at least one clamping screw penetrating said clamping plates.

2. A clamping sleeve for pipes as set forth in claim 1 wherein said means for allowing reduction in the width of said one end portion includes a transverse slot through the said one end portion and the inner end of said one slot opens into said transverse slot.

3. A clamping sleeve for pipes comprising an elastomeric sealing ring having radially disposed end faces, an elongated sheet-metal strip having a substantially uniform width and a generally circular shape, said strip defining a clamping ring for encircling said sealing ring and including radially inwardly directed outer edges extending along the entire length of said strip for engaging and gripping said end faces when said strip is disposed in encircling relation to said sealing ring, said strip having one end portion terminating at one end of said strip, said one end portion having at least one slot therethrough extending longitudinally of said strip, said one slot opening outwardly through said one end and at its inner end opening into a transverse slot through said sheet metal strip, said strip having an opposite end portion terminating at the opposite end of said strip, said opposite end portion overlapping said one end portion and said outer edges of said one end portion being received between said outer edges of said opposite end portion when said strip is disposed in encircling relation to said sealing ring, opposing clamping plates attached to said clamping ring, one of said clamping plates being attached to said clamping ring near said opposite end, the other of said clamping plates being attached to said clamping ring in spaced relation to said one end, said one end portion projecting beyond said other clamping plate, and means for drawing said clamping plates toward each other including at least one clamping screw penetrating said clamping plates.

4. A clamping sleeve for pipes as set forth in claim 3 wherein said one slot is located centrally of said strip.

5. A clamping sleeve as claimed in claim 3, wherein said transverse slot is located near said other clamping plate and extends to the proximity of said outer edges of said clamping ring.

6. A clamping sleeve as claimed in claim 3, wherein the longitudinal slot diverges outward.

7. A clamping sleeve as claimed in claim 3, wherein said one end portion has two slots through it extending longitudinal of said sheet metal strip each of said being arranged near to an outer edge of said clamping ring.

8. A clamping sleeve as claimed in claim 7, wherein the portion of the clamping ring between said slots is reinforced by at least one bead formed in said sheet metal strip and extending longitudinally thereof.

9. A clamping sleeve as claimed in claim 8, wherein said one bead runs out in a generally flattened manner toward said one end.

10. A clamping sleeve as claimed in claim 8, wherein said one bead is parallel to said slots.

11. A clamping sleeve as claimed in claim 10, wherein said one bead runs out in a gradually flattened manner toward said one end.

* * * * *